United States Patent
Kurokawa et al.

(10) Patent No.: US 7,035,980 B2
(45) Date of Patent: Apr. 25, 2006

(54) EFFECTS OF PREFETCHING ON I/O REQUESTS IN AN INFORMATION PROCESSING SYSTEM

(75) Inventors: Isamu Kurokawa, Odawara (JP); Hiroaki Nakanishi, Odawara (JP); Junichi Muto, Odawara (JP); Hisaharu Takeuchi, Odawara (JP); Masahiro Kawaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 10/628,784

(22) Filed: Jul. 28, 2003

(65) Prior Publication Data

US 2004/0039869 A1    Feb. 26, 2004

(30) Foreign Application Priority Data

Aug. 21, 2002  (JP)  .............................. 2002-240719

(51) Int. Cl.
*G06F 12/00* (2006.01)

(52) U.S. Cl. ..................................... 711/137; 712/207

(58) Field of Classification Search ................ 711/137; 712/205, 207, 233–241
See application file for complete search history.

(56) References Cited

U.S. PATENT DOCUMENTS

| 5,381,539 | A | 1/1995 | Yanai et al. ................. 711/133 |
| 5,537,568 | A | 7/1996 | Yanai et al. ................. 711/118 |
| 6,035,375 | A | 3/2000 | Yanai et al. ................. 711/129 |
| 6,721,870 | B1 | 4/2004 | Yochai et al. ............... 711/204 |

FOREIGN PATENT DOCUMENTS

| JP | 06-012328 | 1/1994 |
| JP | 06-119244 | 4/1994 |
| JP | 07-225737 | 8/1995 |
| JP | 08-016466 | 1/1996 |
| JP | 2000-003254 | 1/2000 |

*Primary Examiner*—Nasser Moazzami
(74) *Attorney, Agent, or Firm*—Mattingly, Stanger, Malur & Brundidge, P.C.

(57) ABSTRACT

A data look-ahead control is provided to realize a high cache hit rate and improves responsiveness in an information processing system. In the data look-ahead control, when it is determined that the current input/output request is an access to a specific database that was the subject of a recent input/output request and whose I/O count exceeds a predetermined value, and it is also determined that a cache memory can be occupied to some extent and that there would be no impact on other input/output requests, data including one or more blocks (logical tracks) larger than a block that is the subject of the current I/O request are loaded to the cache memory.

24 Claims, 7 Drawing Sheets

Arrows indicate directions of reading; they can be read in either a longitudinal or a horizontal direction

EFFECTS OF PREFETCHING ON I/O REQUESTS IN AN INFORMATION PROCESSING SYSTEM

BACKGROUND OF THE INVENTION

1. Field of the Invention

The present invention relates to an information processing system that includes a host processing device, an external storage device, and a control device intervening between the host processing device and the external storage device, and especially to a technology to control data look-ahead from the external storage device to a cache memory within the control device in random access input/output request processing from the host processing device.

2. Related Background Art

The common technology to control data look-ahead from an external storage device to a cache memory inside a control device predicts future access pattern based on history information on patterns of access from a host processing device and controls look-ahead. In making the prediction, accumulating access pattern history information is the key.

Technology regarding a look-ahead control through access pattern prediction is known. According to the technology, cache hit/miss information based on a plurality of access requests recently accepted from a host processing device is managed and stored as statistical information for each physical region that was accessed; when one of the regions is subsequently accessed again, the statistical information is referred to and the possibility of cache hit if data are loaded to the cache is determined; if the possibility is high, data in the region, as well as neighboring regions, are loaded to the cache memory.

A technology to optimize the amount of data to be loaded to a cache memory is known. According to the technology, a hit rate is calculated based on the number of cache hits and misses in the past for a block to be accessed, and the amount of data to be loaded to the cache memory is dynamically varied according to the level of the hit rate.

When performing a processing in which random accesses to a database are concentrated within a certain period of time, conventional methods that determine a loading mode to a cache based on access pattern history information have poor sensitivity due to the random nature of the random accesses and cannot offer the optimum loading mode; they cannot realize a rapid improvement in the cache hit rate, input/output requests from a host processing device result in cache misses and therefore in accesses to physical devices (generally HDDs, which are magnetic disk devices), and they rely on the performance (seek time+time for a disk to make one revolution+transfer time) of one HDD for responsiveness.

SUMMARY OF THE INVENTION

In view of the above, the present invention relates to a data look-ahead control method that realizes a high cache hit rate and improves responsiveness using a method with immediate effectiveness even in random accesses.

In accordance with an embodiment of the present invention, an information processing system comprises a host processing device, an external storage device that uses one or more physical devices to store data that are the subject of input/output requests from the host processing device, and a control device intervening between the host processing device and the external storage device and that controls data receiving and sending. The control device includes a cache memory that temporarily stores the data that are divided and managed in blocks of a specified size, a control information memory that stores monitoring information on usage status of the external storage device and the cache memory, and a control section that manages sets of the blocks as logical devices and that is connected to the cache memory and the control information memory to control input/output of the blocks. The control device, when transferring to the host processing device the block that is the subject of input/output request from the host processing device, determines whether the current input/output request concerns a specific data space within a group of limited number of data spaces. The control device further determines the size of the impact that a look-ahead processing performed at present would have on other input/output requests, and the control device loads, in addition to the block that is the subject of input/output request from the host processing device, one or more blocks in the specific data space from the external storage device to the cache memory, if the control device determines that the current input/output request concerns the specific data space and that the impact that the look-ahead processing performed at present would have on other input/output requests would be small.

Further according to the information processing system, when determining whether the current input/output request concerns the specific data space, the control device determines whether the subject of the input/output request is in the group of data spaces; if it is, an I/O count for the corresponding data space is incremented; if it is not, a data space having the smallest I/O count is replaced with the data space that is subject of input/output request; and data spaces whose I/O counts exceed a specified value are determined to be specific data spaces.

Moreover according to the information processing system, when determining the magnitude of the impact the present look-ahead processing would have on other input/output requests, the control device determines that the impact would be small if the sum of capacities of certain data spaces whose individual I/O counts exceed a certain value among the group of data spaces is equal to or less than a capacity of usable regions of the cache memory.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

Figure 1:
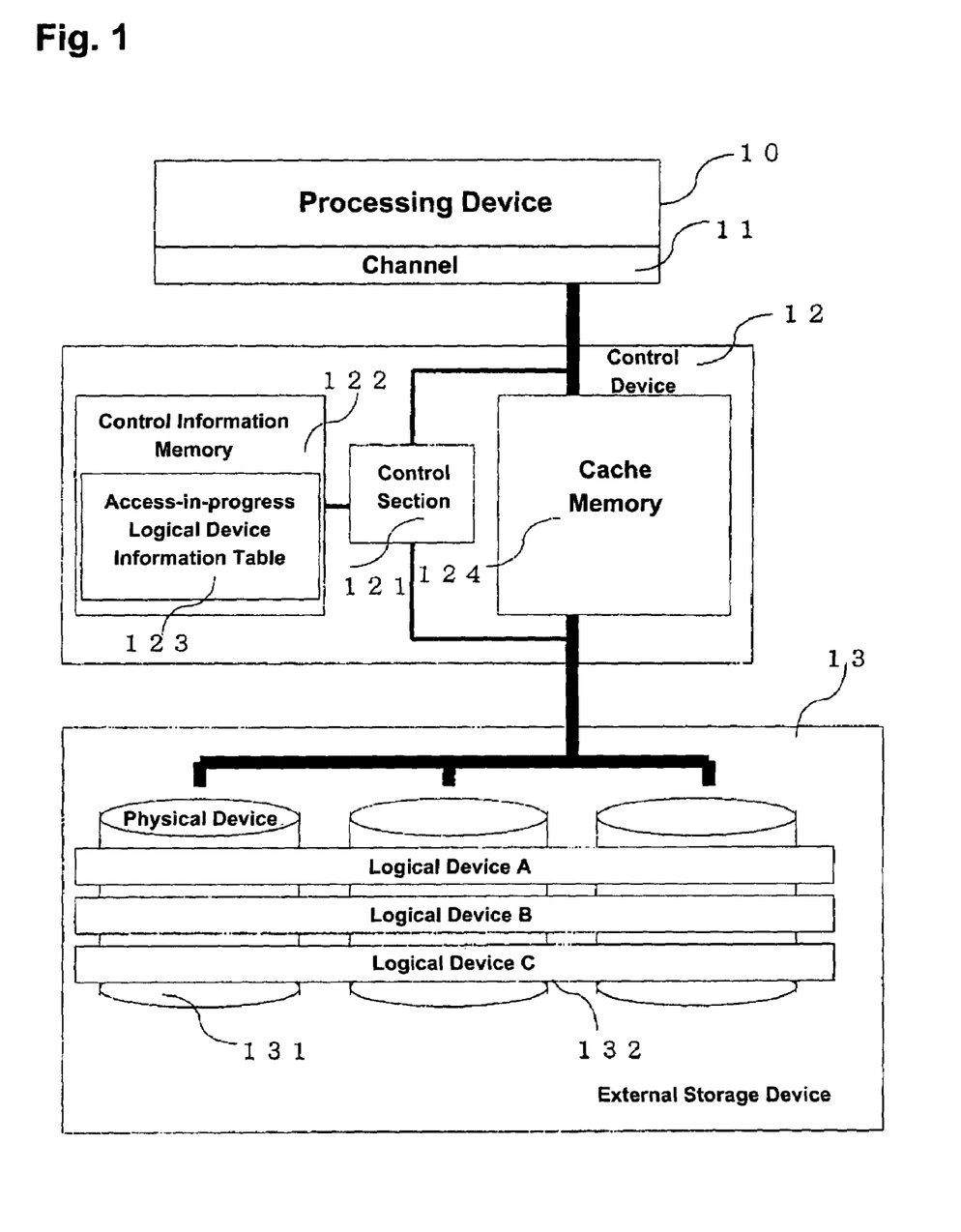
FIG. 1 schematically shows a diagram of the overall structure of an information processing system in accordance with an embodiment of the present invention comprising a host processing device, an external storage device and a control device.
Figure 2:
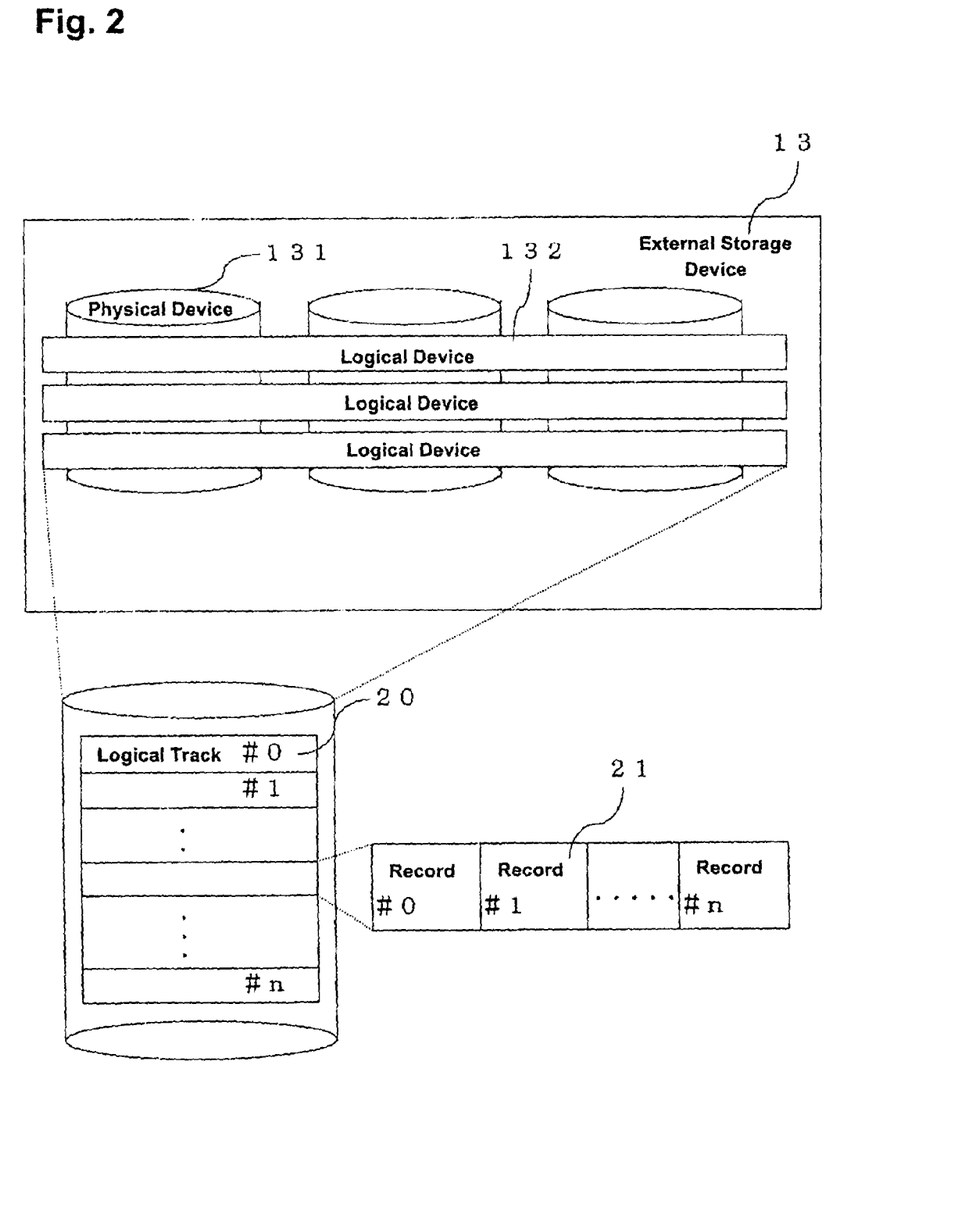
FIG. 2 schematically shows a diagram of the configuration of the external storage device according to the present embodiment.
Figure 3:
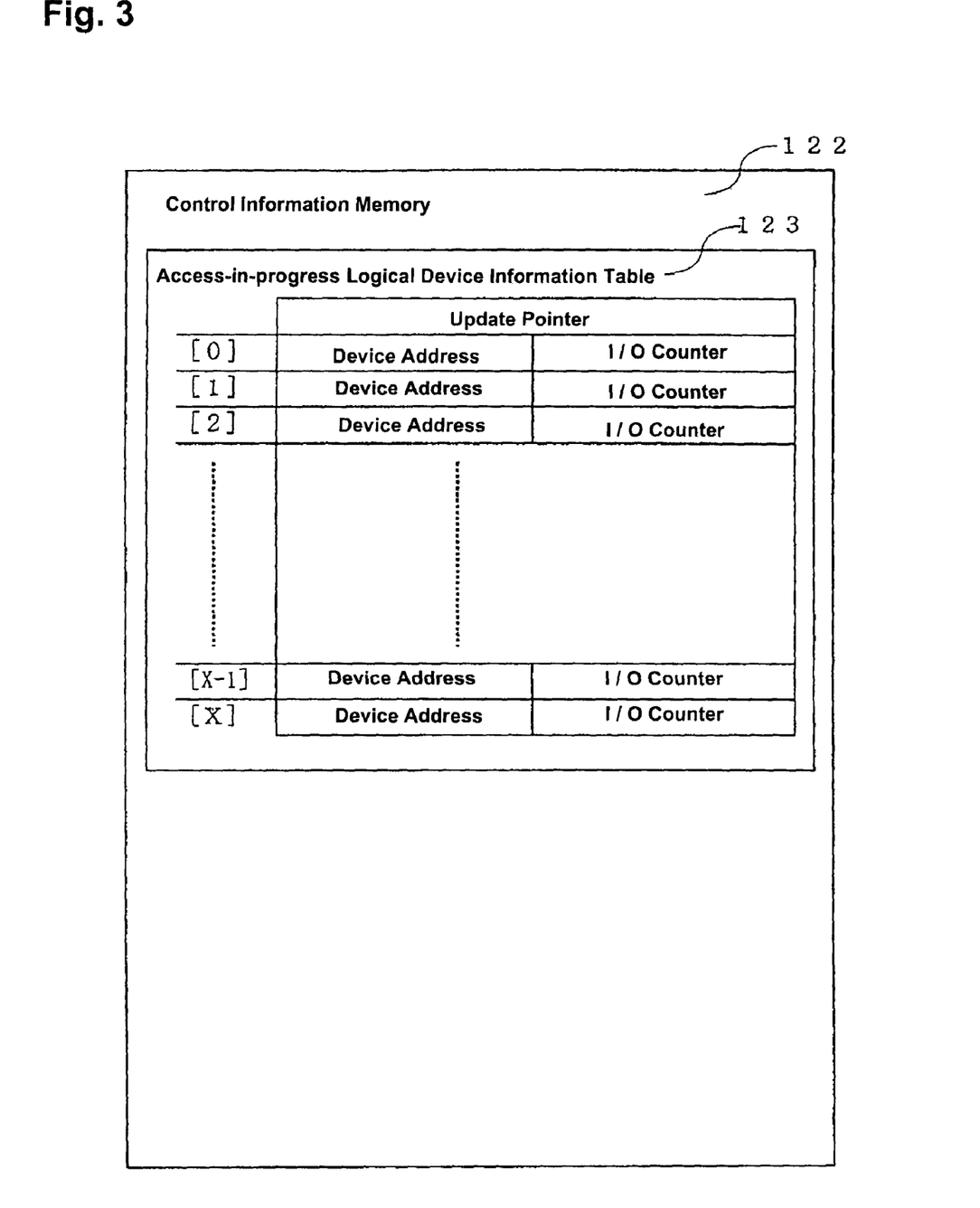
FIG. 3 shows a diagram of information content stored in a control information memory within a control device according to the present embodiment.
Figure 4:
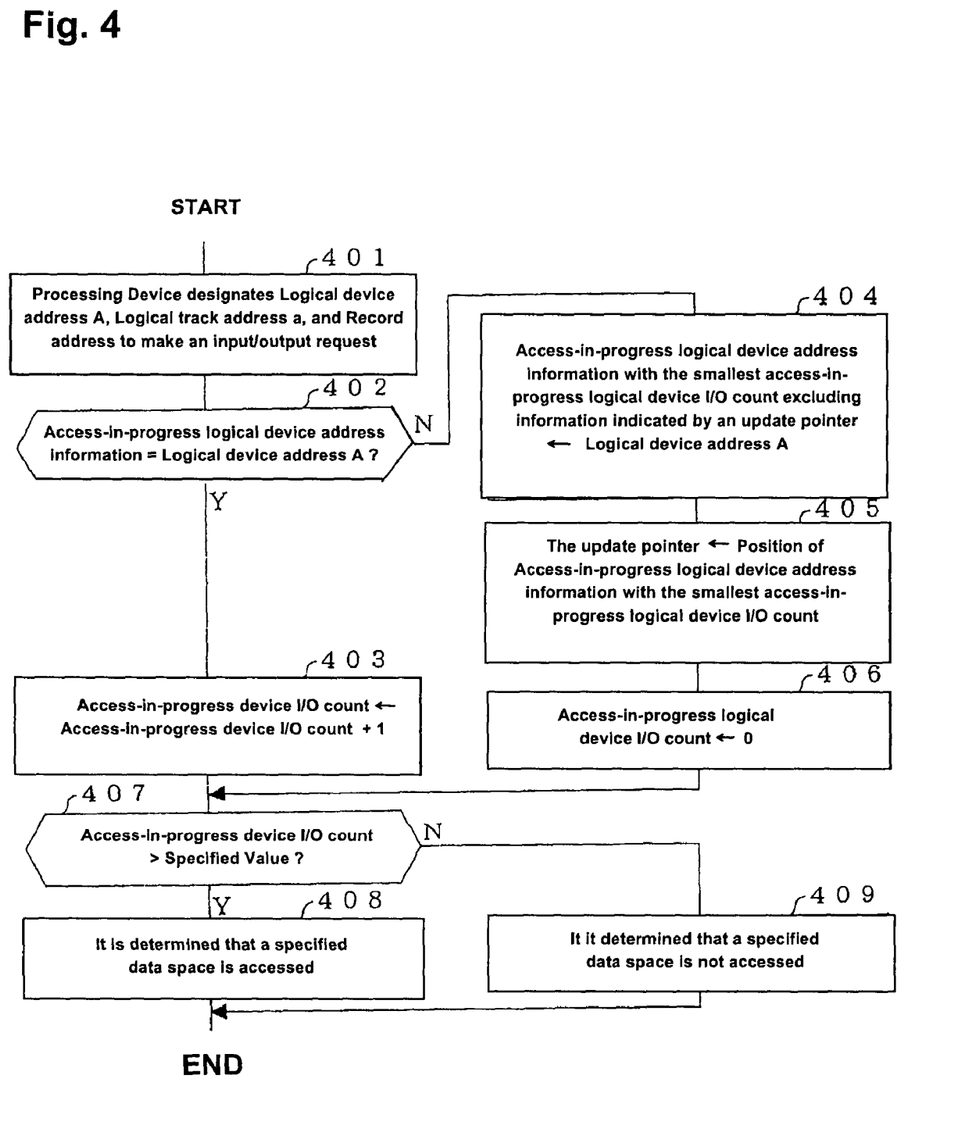
FIG. 4 shows a flow chart of a processing flow to determine whether an input/output request concerns a specific data space (a database).
Figure 5:
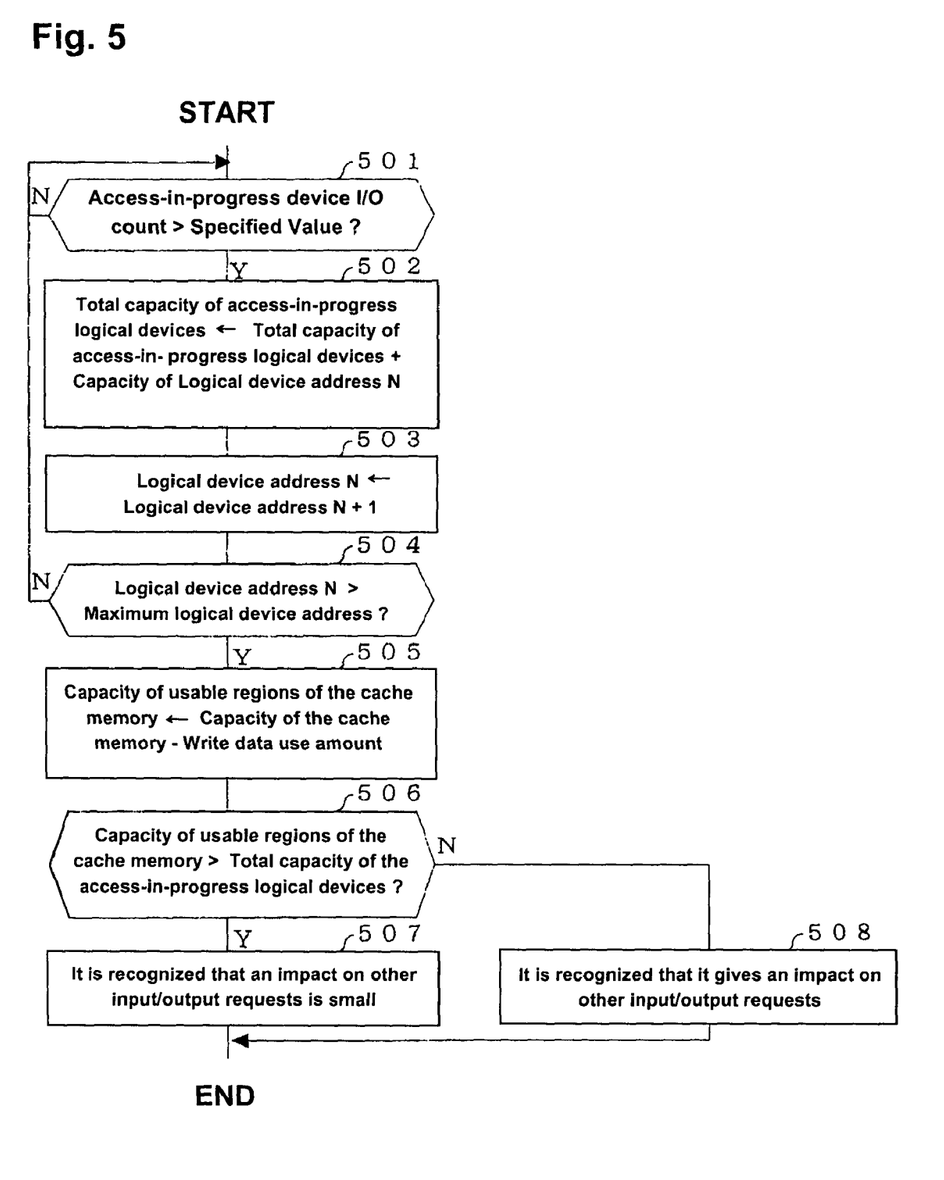
FIG. 5 shows a flow chart of a processing flow to determine whether a look-ahead processing would have impact on other input/output requests.
Figure 6:
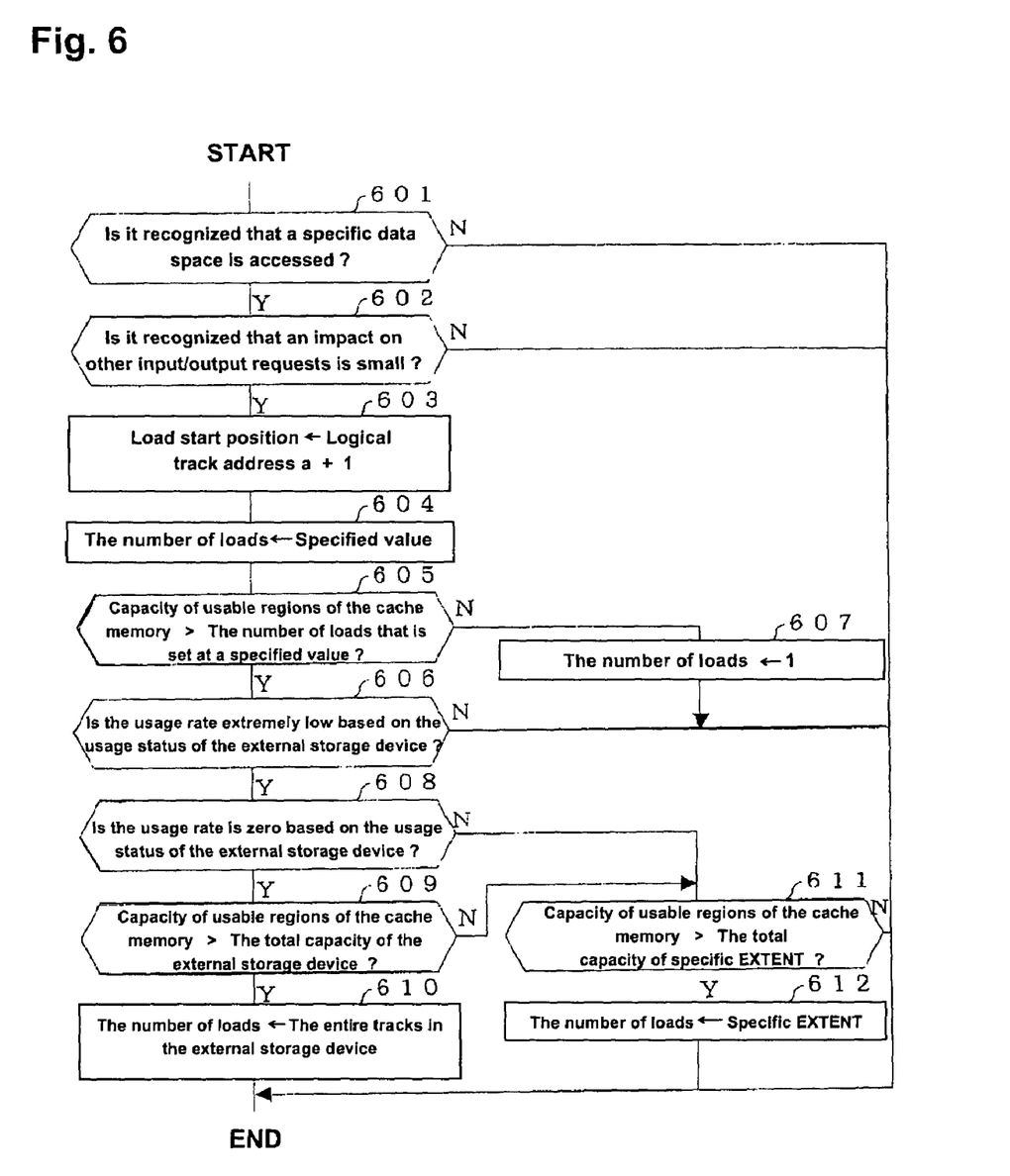
FIG. 6 shows a flow chart of a processing flow to load one or more blocks (logical tracks) inside a specific data space (a database) to a cache memory.
Figure 7:
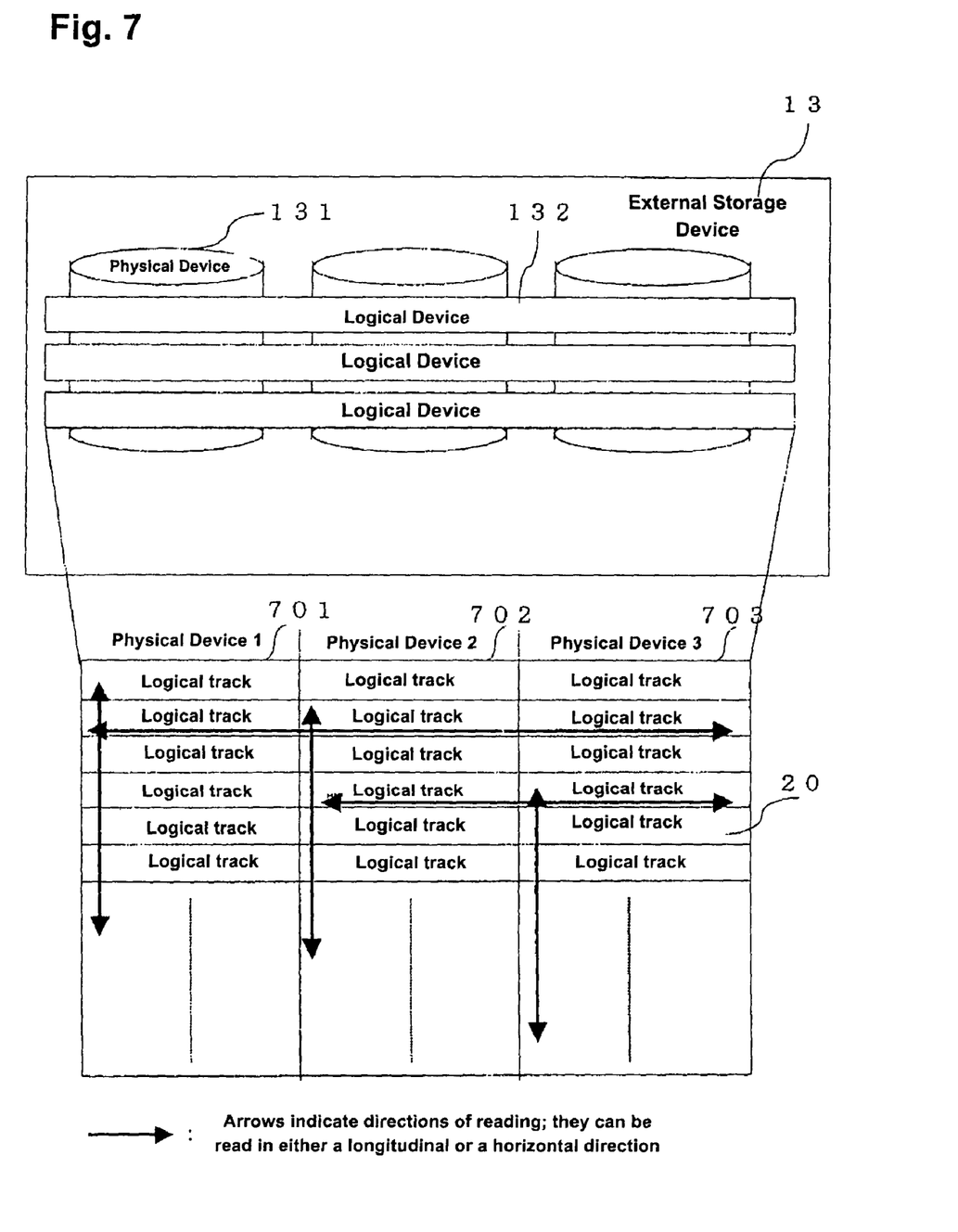
FIG. 7 shows a diagram of a usage mode for using a physical device based on logical tracks.

An information processing system in accordance with an embodiment of the present invention will be described in detail with references to the accompanying drawings. FIG. 1 schematically shows a diagram of the overall structure of an information processing system according to the embodiment of the present invention comprising a host processing device, an external storage device and a control device; FIG. 2 schematically shows a diagram of the configuration of the external storage device according to the present embodiment; FIG. 3 is a diagram of information content stored in a control information memory within the control device according to the present embodiment. FIG. 4 is a flow chart of a processing flow to determine whether an input/output request concerns a specific data space (specifically, a database); FIG. 5 is a flow chart of a processing flow to determine whether a look-ahead processing would impact other input/output requests; FIG. 6 is a flow chart of a processing flow to load one or more blocks (specifically, logical tracks) inside a specific data space (specifically, a database) to a cache memory. FIG. 7 schematically shows a diagram of a usage mode for using a physical device based on logical tracks.

Description of the Overall Structure of the Information Processing System

The information processing system shown in FIG. 1 comprises a processing device 10 that performs information operations, a channel 11 that performs input/output controls such as data transfer, an external storage device 13, and a control device 12 that controls data sending and receiving between the processing device 10 and the external storage device 13. The control device 12 has recording and regeneration functions for a control information memory 122, which stores control information that is used when controls are implemented. In the information processing system, based on an instruction from the processing device 10, a data input/output instruction is issued to logical devices 132, which are defined inside the external storage device 13, via the channel 11 and a cache memory 124 inside the control device 12. The data that are the subject of input/output request from the processing device 10 are normally stored in the cache memory 124 on a logical track-by-a logical track 20 basis, as shown in FIG. 2.

Information obtained by a control section 121's monitoring of the usage status of the external storage device 13, physical devices 131 and the cache memory 124 is stored in the control information memory 122.

The external storage device 13 shown in FIG. 2 is composed of one or more physical devices 131 (e.g., HDD). Data that are the subject of input/output request from the processing device 10 are managed in units of the logical devices 132. Each logical device 132 is defined by the control device 12 as one logical device divided into logical ranges for purposes of control over a group of one or more physical devices 131, and divided regions of the logical devices 132 are distributed over the physical devices 131 (for example, over individual HDDs).

Generally, regions of each logical device 132 divided into logical ranges for purposes of control are defined by the logical tracks 20. Each of the logical tracks 20 comprises logical records 21, which are the smallest units of one logical device 132 divided into logical ranges for purposes of control. The processing device 10 designates a logical track address and a logical record address within the logical device 132 in which data that are the subject of input/output request exist, in order to issue a data input/output instruction to the control device 12.

An access-in-progress logical device information table 123 (i.e., a table of logical devices to which accesses have been made frequently up to the present) consists of elements that are assigned numbers 0–X, numbering X+1 items, and the composition content of each item consists of a logical device address and an I/O count. Specifically, individual device addresses in the access-in-progress logical device information table 123 specify one of the logical devices A, B or C in the example in FIG. 1; the I/O count is the number of I/O requests made; and each of the numbers 0 s–X specifies the number of logical devices that have been addressed up to the present, such that, as a specific example, if the number of logical devices is in the order of several hundreds to several thousands, X would be in the order of several to several dozen items. The number X+1 items indicates the number of logical devices that are the subject of look-ahead data to be stored in the cache memory 124.

Although the number X+1 items is an arbitrary value, there is an upper limit value to identify a specific data space. The number of items in the list of logical devices 132 in FIG. 3 is determined by taking into account the capacity of the cache memory 124 and the frequency of accesses; the list constitutes a group of candidates of logical devices 132 from which look-ahead data would be transferred to the cache memory 124. A data space refers to the size of data a host processing device accesses in order to implement a certain processing and is a data region within a logical region accessed. A specific example would be a database used, but it can also be a logical device, a specific region within the logical device, or an external storage device of a RAID.

Furthermore, by adding EXTENT information, which is a designation by the host processing device of beginning and ending addresses of the logical tracks 20 as an access range before making an input/output request, to the composition content of each element of the access-in-progress device information table 123, a resolution for the input/output request processing that reaches a specific region of the logical device 132 can be obtained.

[Description of Processing to Determine That Input/Output Request Concerns Specific Data Space (Database)]

FIG. 4 shows a flowchart of a processing to determine that an input/output request concerns a specific data space. In step 401, the processing device 10 designates a logical device with an address A that is the subject of input/output request, a logical track with an address α within the logical device 132 in which the desired data exists, and a logical record address, and issues a data input/output instruction to the control device 12. Based on the instruction from the processing device 10, the control device 12 implements an input/output processing to the logical track with the address α.

In step 402, whether a logical device address that matches the logical device address A, which is the subject of the input/output request, is in the access-in-progress logical device information table 123 is searched. If there is a match, the processing proceeds to step 403. In step 403, the I/O count of the logical device address A in the access-in-progress device information table 123 is incremented.

On the other hand, if there is no match, the logical device address A is stored in the access-in-progress logical device address information with the smallest I/O count among information in the access-in-progress logical device information table 123, excluding information indicated by an update pointer (i.e., information regarding a logical device that was most recently accessed). In other words, if the logical device that is the subject of the input/output request from the processing device 10 is not found in 0–X in the access-in-progress logical device information table 123 shown in FIG. 3, the logical device that is the subject of the input/output request replaces the device address with the smallest I/O count among the existing 0–X excluding the logical device that was most recently accessed, and is thereby added to the list in FIG. 3.

In step 405, the position in which the logical device address A is stored is stored in the update pointer (i.e., that the most recent access was made to the logical device address A, which was newly added to the list in FIG. 3, is stored). In step 406, the I/O count of the logical device address A is initialized.

In step 407, whether the I/O count of the logical device address A that is the subject of input/output request is larger than a specified value is determined. If the determination result is true, the input/output request is recognized as accessing a specific data space (database). On the other hand, if the determination result is false, the input/output request is recognized as not accessing a specific data space.

As described above, if the subject of an input/output request is a logical device found in the access-in-progress logical device information table 123 in FIG. 3, the corresponding I/O count is increased by one; if the subject of an input/output request is not found in the access-in-progress logical device information table 123 in FIG. 3, an item replacement takes place on the list. The address of the logical device that is the subject of the most recent input/output request is indicated by the update pointer. Furthermore, the fact that the I/O count for the logical drive exceeds a specified value is determined that the specific data space is accessed, and data in the logical device, which corresponds to the specific data space, is determined to be the possible subject of a look-ahead processing.

Processing to Recognize the Impact Look-Ahead Processing Performed at Present Would Have on Other Input/Output Requests FIG. 5 shows a flowchart of a processing to recognize the impact a look-ahead processing performed at present would have on other input/output requests.

In steps 501 through 504, the total capacity of access-in-progress logical devices is calculated based on the sum of capacities of the logical devices whose I/O counts exceed a specified value in the access-in-progress logical device information table 123. Specifically, the sum refers to the sum of capacities of the logical devices on the 0–X list in the access-in-progress logical device information table 123 in FIG. 3 whose I/O counts exceed a specified value, and the processing indicates a procedure of first assigning 0 to an address N, incrementing the address sequentially, finally assigning X to the last address, and thereby forming a loop to find the sum.

In step 505, the capacity of usable regions of the cache memory 124 is calculated based on the cache memory usage status monitored by the control section 121 (the capacity of usable regions of the cache memory 124=cache capacity–write data use amount). In step 506, whether the total capacity of the access-in-progress logical devices is smaller than the capacity of usable regions of the cache memory 124 is determined. If the determination result is true, the look-ahead processing performed at present is recognized not to impact other input/output requests. On the other hand, if the determination result is false, the look-ahead processing performed at present is recognized to impact other input/output requests.

Processing to Load One or More Blocks in Specific Data Space to Cache Memory

FIG. 6 shows as a flowchart a processing to toad one or more blocks (logical tracks) in a specific data space (database) to a cache memory.

In steps 601 and 602, determinations are made that an input/output request concerns an access to a specific data space (see the processing flow in FIG. 4) and that the input/output request would not impact other input/output requests (see the processing flow in FIG. 5). If the determination result of either is false, logical tracks other than the logical track with logical track address α, which is the subject of input/output request, are not loaded to the cache memory 124.

On the other hand, if the determination results of both are true, in step 603, the starting position of loading to the cache memory 124 is set as the logical track address α+1, which is the address of the logical track immediately following the address of the logical track that is the subject of the input/output request. In other words, a look-ahead is performed on the logical track with address α+1, which is the address of the logical track immediately following the address of the logical track that is the subject of the input/output request, to be loaded to the cache memory 124. In step 604, the number of loads to the cache memory 124 is set at a certain value (i.e., the number of logical tracks on which look-ahead is performed is set at a certain value).

In step 605, whether the total capacity of the number of tracks to be loaded that is set at a certain value (i.e., the look-ahead data capacity) is smaller than the capacity of usable regions of the cache memory 124 calculated in step 505 in FIG. 5 is determined. If the determination result is false, in step 607 the number of loads to the cache memory 124 is set at the minimum value (for example, the number of loads is set at 1). When loading data from the external storage device 13 to the cache memory 124, the number of blocks (for example, the number of logical tracks) to be loaded to the cache memory 124 can be dynamically varied in order to prevent the number of blocks from exceeding the capacity of usable regions of the cache memory 124. On the other hand, if the determination result is true, in step 606, whether the usage rate is extremely low is determined based on the usage status of the external storage device 13 monitored by the control section 121.

If the determination result is false, the number of loads to the cache memory 124 remains at a certain value. On the other hand, if the determination result is true, in step 608, whether the usage rate is zero is determined based on the usage status of the external storage device 13 monitored by the control section 121. If the determination result is true, in step 609 whether the total capacity of the external storage device 13 is smaller than the capacity of the usable regions of the cache memory 124 is determined. If the determination result is true, in step 610 the number of loads to the cache memory 124 is set as the number of all tracks in the external storage device 13. In this case, the starting position for loading determined in step 603 becomes invalid.

On the other hand, if the determination result in step 608 is false (i.e., if the usage rate of the external storage device 13 is extremely low but not zero), or if the determination result in step 609 is false (i.e., if the capacity of usable regions of the cache memory 124 is not larger than the total capacity of the external storage device 13), in step 611, whether the total capacity of the number of tracks that correspond to the EXTENT information, which is a designation by the host processing device 10 of the beginning and ending addresses of logical tracks as an access range before making the input/output request, is smaller than the capacity of the usable regions of the cache memory 124 is determined. If the determination result is true, in step 612 the number of loads to the cache memory 124 is set as the number of tracks that corresponds to the EXTENT information. In this case also the starting position for loading determined in step 603 becomes invalid. On the other hand, if the determination result is false, the number of loads to the cache memory 124 remains at a certain value.

Using the processing flows shown in FIGS. 4, 5 and 6, data are loaded from the physical devices 131 in the external storage device 13 to the cache memory 124. FIG. 7 shows the usage status of the physical devices 131 during such a process. 701–703 in FIG. 7 show how the logical tracks 20 of the logical devices 132 are arranged in each of the physical devices 131.

Cells in 701–703 in FIG. 7 are consecutive address spaces inside each of the physical devices 131. However, a logical track 20 that is arranged in the cells in 701–703 in FIG. 7 and another logical track 20 in cells adjacent to the first within one of the physical devices 131 do not necessarily correspond to consecutive address spaces within one of the logical devices 132.

There are cases in which the adjacent logical tracks 20 in adjacent physical devices 131 correspond to consecutive address spaces within one of the logical devices 132. Furthermore, there are cases in which the logical tracks 20 in cells adjacent to each other vertically or horizontally in 701–703 in FIG. 7 do not correspond to consecutive address spaces within any one of the logical device 132.

If the logical tracks 20 in adjacent cells of one of the physical devices 131 correspond to consecutive address spaces within one of the logical devices 132, a load processing takes place in the vertical direction of the specific physical device 131. If adjacent logical tracks 20 in adjacent physical devices 131 correspond to consecutive address spaces in one of the logical devices 132, a load processing in the horizontal direction must take place, which means that a load processing occurs in a plurality of the physical devices 131.

As described above, although there would be a difference in the number of physical devices 131 in operation, the implementation of the present invention is not affected by how the logical tracks 20 are arranged.

As described above, according to the present invention, instead of predicting a future access pattern as in prior art, when it is determined that a cache memory can be occupied to some extent in response to a current input/output request and that the current input/output request would not impact other input/output requests, data including a plurality of blocks significantly larger than the block that is the subject of the I/O request (a block is a unit of data divisions; specifically, a block is a single logical track, but two logical tracks can be combined to form one block) are loaded to the cache memory in a single access to HDD.

In other words, the objective of the present invention is to maximize the usage rate of resources (cache memory or bus) that are subordinate to the control device for a current input/output request by reading more data than data that is required instead of predicting. Even in random access, as long as the size of a database has a limit, there is a high possibility that an access would occur in the vicinity of a region previously accessed.

Since cache memories mounted on control devices have grown larger in recent times, using the device or method according to the present invention would cause random I/Os that succeed other I/Os to result in cache hits and not require any access to HDDs, which would lead to a responsiveness superior to the performance of one HDD.

In RAIDs, a plurality of HDDs form a RAID group and HDDs that form the RAID group have large capacities, which allows a plurality of databases to be stored in the RAID group. Since there is a high probability that the next I/O request would entail an access to a different HDD within the same RAID group due to the fact that the access mode is random access, it is unlikely for the preceding I/O request to collide with the next I/O (i.e., while the first I/O processing is in progress (slow transfer rate), the next I/O request is made to the same HDD) even if one HDD is occupied by the preceding I/O request; as a result, the present invention is especially effective in RAIDs in which the succeeding I/O request is likely to be a random access to a different HDD. On the other hand, when accesses to a plurality of databases within one RAID group are made, having one I/O occupy one HDD for a long time can cause a collision with other I/Os, which leads to waiting and low responsiveness; consequently, a means to determine that accesses to a number of databases are not taking place may need be provided.

As described above, instead of using past access patterns, in which cache hit or miss information is stored and managed for each data region, and loading data to a cache memory based on the access pattern history information as in prior arts, the embodiment according to the present invention places importance on a database to which the most recent input/output request was made, and maximizes the capacity of usable regions of a cache memory by loading not only the logical track that is the subject of the input/output request, but also looking ahead and loading a logical track that succeeds the logical track that is the subject of the input/output request; when this happens, since the embodiment according to the present invention takes into consideration databases whose I/O counts exceed a certain value, the databases with the most recent I/O request or with the highest I/O frequency become targets of a look-ahead, thereby enhancing efficiency in terms of cache hits and in terms of memory usage efficiency.

When performing a processing in which random accesses to a database are concentrated within a certain period of time, instead of conventional methods that determine a loading mode to a cache based on access pattern history information, the present invention enhances immediate effectiveness by implementing a processing that maximizes the usage rate of resources within a control device in order to realize a high cache hit rate and improve responsiveness even in random accesses.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing system comprising:
a host processing device;
an external storage device that uses one or more physical devices to store data that are subjects of input/output requests from the host processing device; and
a control device intervening between the host processing device and the external storage device and that controls data receiving and sending, wherein the control device determines whether an input/output request for a data block from the host processing device concerns a specific data space within a group of limited number of data spaces and determines a magnitude of impact that a look-ahead processing performed at present have on other input/output requests, and controls to load more data blocks than the data block that is a subject of the input/output request onto a cache memory depending on a determination result when transferring to the host processing device the data block that is the subject of the input/output request from the host processing device.

2. An information processing system according to claim 1, wherein, when determining whether the input/output request at present concerns the specific data space, the control device determines whether the subject of the input/output request concerns the group of data spaces, and increments an I/O count for the corresponding data space if the subject of the input/output request concerns the group of data spaces.

3. An information processing system according to claim 1, wherein, when determining whether the current input/output request concerns the specific data space, the control device determines whether the subject of the input/output request concerns the group of data spaces, and replaces a data space having the smallest I/O count with the data space that is subject of input/output request, if the subject of the input/output request does not concern the group of data spaces.

4. An information processing system according to claim 1, wherein, when determining whether the current input/output request concerns the specific data space, the control device determines whether the subject of the input/output request concerns the group of data spaces, and determines that the input/output request at present concerns the specific data space if an I/O count for the corresponding data space exceeds a specified value.

5. An information processing system according to claim 1, wherein, when determining the magnitude of the impact the present look-ahead processing have on other input/output requests, the control device determines that the impact is small if the sum of capacities of specified data spaces whose individual I/O counts exceed a certain value among the group of data spaces is equal to or less than a capacity of usable regions of the cache memory.

6. An information processing system according to claim 1, wherein the data space corresponds to one logic device.

7. An information processing system according to claim 6, wherein the data space corresponds to a specified region on the one logic device.

8. An information processing system according to claim 1, wherein the data space corresponds to logically grouped external storage devices.

9. An information processing system according to claim 1, wherein, when loading data blocks from the external storage device to the cache memory, the number of data blocks to be loaded onto the cache memory is changed such that the data blocks loaded onto the cache memory does not exceed a capacity of usable regions of the cache memory.

10. An information processing system according to claim 1, wherein, when a determination is made that the input/output request for the data block from the host processing device does not concern the specific data space, the control device controls not to load from the external storage device any data block other than the data block that is the subject of the input/output request onto the cache memory.

11. An information processing system according to claim 1, wherein, when a determination is made that the look-ahead processing performed at present has a predetermined impact on other input/output requests, the control device controls not to load from the external storage device any data block other than the data block that is the subject of the input/output request onto the cache memory.

12. An information processing system according to claim 1, wherein each of the data blocks corresponds logical tracks.

13. An information processing system comprising:
a host processing device;
an external storage device that uses one or more physical devices to store data that are subjects of input/output requests from the host processing device; and
a control device intervening between the host processing device and the external storage device and that controls data receiving and sending, wherein the control device includes a cache memory that temporarily stores data that are divided and managed in blocks of a specified size, a control information memory that stores monitoring information on usage status of the external storage device and the cache memory, and a control section that manages sets of the blocks as logical devices and that is connected to the cache memory and the control information memory to control input/output of the blocks, wherein the control device, when transferring to the host processing device a data block that is a subject of a current input/output request from the host processing device, determines whether the current input/output request concerns a specific data space within a group of limited number of data spaces, and determines a magnitude of impact that a look-ahead processing performed at present would have on other input/output requests, and loads, in addition to the block that is the subject of the current input/output request from the host processing device, one or more blocks in the specific data space from the external storage device to the cache memory, if the control device determines that the current input/output request concerns the specific data space and that the impact that the look-ahead processing performed at present have on other input/output requests is a specified level or smaller.

14. An information processing system according to claim 13, wherein, when determining whether the input/output request at present concerns the specific data space, the control device determines whether the subject of the input/output request concerns the group of data spaces, and increments an I/O count for the corresponding data space if the subject of the input/output request concerns the group of data spaces.

15. An information processing system according to claim 13, wherein, when determining whether the current input/output request concerns the specific data space, the control device determines whether the subject of the input/output request concerns the group of data spaces, and replaces a data space having the smallest I/O count with the data space that is subject of input/output request, if the subject of the input/output request does not concern the group of data spaces.

16. An information processing system according to claim 13, wherein, when determining whether the current input/output request concerns the specific data space, the control device determines whether the subject of the input/output request concerns the group of data spaces, and determines that the input/output request at present concerns the specific data space if an I/O count for the corresponding data space exceeds a specified value.

17. An information processing system according to claim 13, wherein, when determining the magnitude of the impact the present look-ahead processing have on other input/output requests, the control device determines that the impact is small if the sum of capacities of specified data spaces whose individual I/O counts exceed a certain value among the group of data spaces is equal to or less than a capacity of usable regions of the cache memory.

18. An information processing system according to claim 13, wherein the data space corresponds to one logic device.

19. An information processing system according to claim 18, wherein the data space corresponds to a specified region on the one logic device.

20. An information processing system according to claim 13, wherein the data space corresponds to logically grouped external storage devices.

21. An information processing system according to claim 13, wherein, when loading data blocks from the external storage device to the cache memory, the number of data blocks to be loaded onto the cache memory is changed such that the data blocks loaded onto the cache memory does not exceed a capacity of usable regions of the cache memory.

22. An information processing system according to claim 13, wherein, when a determination is made that the input/output request for the data block from the host processing device does not concern the specific data space, the control device controls not to load from the external storage device any data block other than the data block that is the subject of the input/output request onto the cache memory.

23. An information processing system according to claim 13, wherein, when a determination is made that the look-ahead processing performed at present has a predetermined impact on other input/output requests, the control device controls not to load from the external storage device any data block other than the data block that is the subject of the input/output request onto the cache memory.

24. An information processing system according to claim 13, wherein each of the data blocks corresponds logical tracks.

* * * * *